Nov. 19, 1968     J. D. KOHN     3,411,723
DISPOSABLE SPATULA
Filed Jan. 27, 1966
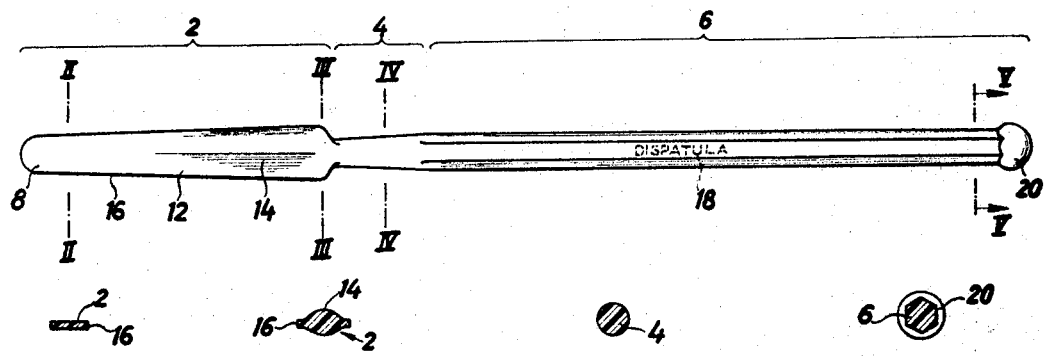
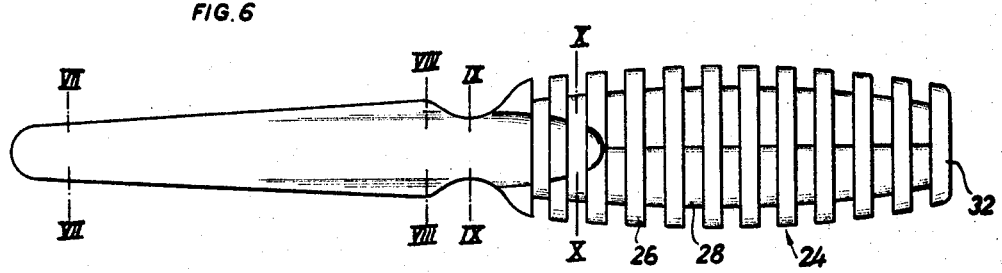
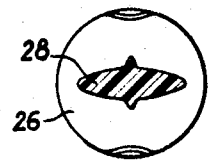
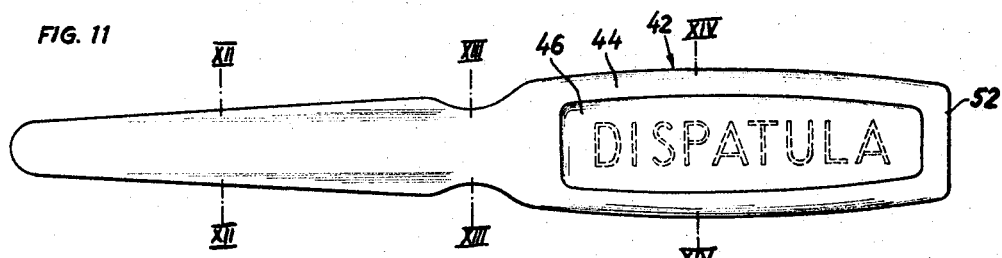
 

3,411,723
DISPOSABLE SPATULA
Joseph D. Kohn, 126 Amory St.,
Brookline, Mass. 02146
Filed Jan. 27, 1966, Ser. No. 523,308
10 Claims. (Cl. 241—168)

ABSTRACT OF THE DISCLOSURE

The disposable spatula, preferably molded of an inexpensive plastic material, is shaped to substantially duplicate the major characteristics of ordinary metal spatulas. One notable feature of all embodiments is the use of a thick blade molded with square side edges and with the mold parting line between the edges.

---

The invention relates to a spatula, and more particularly to a disposable spatula so designed that, when molded of an inexpensive material, it affords the familiar characteristics associated with the metal spatulas in common use today.

Metal spatulas are widely used in mixing and spreading operations by a variety of people. Dentists use metal spatulas to mix dental pastes and cements; druggists and doctors use metal spatulas to compound ointments; painters and artists use metal spatulas to mix and spread pigments and pastes. After each use, the metal spatula must be cleaned of the paste or cement, and this cleaning operation is tiresome and difficult, especially if the material has hardened on the metal blade.

If spatulas could be formed of a material less expensive than metal, a material inexpensive enough to permit the spatulas to be economically discarded after a single use, then they would not have to be cleaned. But attempts to duplicate a metal spatula with a less expensive material, such as plastic, have not been entirely successful. For mixing and spreading operations the blade of the spatula must be stiff, yet for scraping operations it should have a sharp edge. If the sides of the blade of a plastic spatula are shaped to form thin, sharp, knife edges, duplicating those of a metal spatula, then during use such a thin edge tends to crack and break away, and the blade is too flexible. Furthermore, should this thin edge lie on the parting line of the mold in which the plastic spatula is formed, as is natural, undesirable flash tends to form about the thin edge during the molding operation, and must be removed. If the longitudinal sides of the plastic blade are generally parallel, as in metal spatulas, then to adequately space the user's hand from the mixing operation the plastic handle must be at least as long as the handle of a metal spatula. Because of the leverage and strains exerted by the long handle on the spatula during use, both the handle and the blade of a plastic spatula must be made quite thick to resist fracture, and this requirement in turn multiplies the cost of such a plastic spatula. Because of these problems, no economical disposable spatula has been offered to the trade, and metal spatulas are still in common use, even though cleaning them after each use is a tedious and time consuming task.

This invention provides a spatula so designed that when formed of an inexpensive plastic material it retains the familiar characteristics of metal spatulas, while properly functioning in use. Among its more notable characteristics are: a wide, flat blade which is thick enough to provide adequate stiffness; the edges of the blade are squared to provide sharp corners for scraping the material together during the mixing operation; and the longitudinal sides of the blade diverge towards the handle to space the user's hand from the mixing surface, especially during the scraping operation. Extending from the blade portion is the handle portion of the spatula which, in one embodiment may be polygonal, preferably hexagonal, in cross-section to provide longitudinal ridges on the handle and to permit the spatula to be securely held by one's hand. The rear end of the handle may terminate in a knob, which fits comfortably in one's palm and gives a better purchase. In another larger embodiment of the spatula, the handle portion may have a flattened end or base so that after use the spatula may be set on end and the messy blade held aloft.

The invention will be further described in connection with the accompanying drawings, in which:

FIGURE 1 is a plan view of one form of the spatula;

FIGURES 2 through 5 are transverse sectional views taken on lines II—II through V—V respectively of FIGURE 1;

FIGURE 6 is a plan view of another form of the spatula;

FIGURES 7 through 10 are transverse sectional views taken on lines VII—VII through X—X respectively of FIGURE 6;

FIGURE 11 is a plan view of still another form of the spatula; and

FIGURES 12 through 14 are transverse sectional views taken on lines XII—XII through XIV—XIV respectively of FIGURE 11.

In use basically two types of spatulas are required, a smaller model for mixing smaller amounts of material and affording precise control, and a larger model for mixing larger and heavier amounts of material when quick intermixing of bulky quantities is desired. This invention provides two such models, a plan view of smaller model being shown in FIGURE 1 and 2 forms of the larger model in FIGURES 6 and 11.

In the model shown in FIGURE 1, the spatula includes a blade portion 2, a shank portion 4 and a handle portion 6. The blade includes a thin, preferably rounded, tip 8 and a body portion 12. The blade is thick enough throughout its cross-section to present substantial resistance to deflection during use. The thickness of the blade gradually increases approaching the shank, to provide a blade with a flexible tip and a body of increasing stiffness towards the shank. The thickness of the blade is greater at the center than at the edges; and this difference increases approaching the shank. This results in longitudinal indentations adjacent the edges of the blade and a central ridge 14, as best shown in FIGURE 3. As material is being spread by the spatula, the indentations tend to trap and crush any lumps in the mixture under the central ridge over a range of blade inclinations.

The longitudinal sides 16 of the blade form straight and sharp, preferably square, edges or corners with the top and bottom of the blade. During a mixing operation, by tilting the blade to bring one of its edges to bear on the mixing tablet, the material being mixed may be cleanly scraped together using the sharp flat blade surface and edge before again being spread out on the surface of the mixing tablet using the flat blade surface and ridge 14. The sides 16 preferably diverge gradually or widen from the tip to the base of the blade, thereby naturally raising the handle from the mixing tablet when the blade is tilted and an edge set on the tablet, as during a scraping operation. Because of this, the handle may be shortened somewhat to reduce the leverage and strains exerted on the spatula during use, while still adequately spacing the user's hand from the tablet. Thus the diverging sides of the blade, by resulting in a greater angle of attack during a mixing operation, raise the user's hand from the tablet and the material being mixed, and minimize contact and dirtying of one's hands with the material being mixed.

At its rearward end the blade merges into the shank, and the edges of the blade quickly converge and taper off into the rounded body of the shank. The rounded shank in turn merges into the handle which in cross-section is polygonal, preferably hexagonal. The flat surfaces provided by the polygonal shape of the handle may bear indicia, or advertising, 18. A spherical knob 20 is provided at the rear end of the handle and fits comfortably in the palm. In addition, it may function as the nose of a pestle to crush particles of cement in the mixture, if desired.

During use of this model of the spatula, usually the forefinger bears on the shank, the handle is held between the thumb and middle finger, and the spherical knob is pressed by the remaining fingers into the side of the palm or caught in the crook of the little finger. The many flat surfaces of the hexagonal handle permit the thumb and middle finger to position the blade exactly as desired, and the longitudinal ridges on the handle materially assist the remaining fingers in maintaining this positioning during the mixing operation.

Preferably the spatula is injected molded of a relatively inexpensive plastic, such as a general purpose polystyrene, to minimize production costs in keeping with its disposable character. The mold parting line may extend along the side corner of the polygonal handle and along the side 16 of the blade between the square side edges. Thus traces of the mold parting line will appear on the blade only on the side surface between the side edges. However, because of the square side of the blade, substantially no flash will occur about the blade during the molding operation. The plastic may be colored to form a spatula which contrasts well with the material being mixed, as opposed to a shiny, reflective metal spatula which affords little contrast.

The models of the spatula shown in FIGURES 6 and 11, while substantially larger, nevertheless are basically similar to the model shown in FIGURE 1. These constructions of the spatula all include a relatively thick blade, when compared with the blade of a metal spatula, and the side edges of all the blades are squared and diverge towards the shank and handle. All the blades include a central longitudinal ridge merging into their rounded shank portions, and function in similar fashions.

The model of the spatula shown in FIGURE 6 includes a handle portion 24 formed as a series of spaced discs 26 interconnected by a longitudinal rib 28. The discs are spaced from one another sufficiently to interleave with the discs of a similar spatula. Because of this interleaving feature, as a quantity of spatulas are being packed together in a box the handles of adjacent spatulas may interleave with one another and the spatulas nest together, which interfitting conserves an appreciable amount of packaging space. Furthermore, the disc construction of the handle also substantially reduces the amount of material required to form the spatula, in keeping with its inexpensive, disposable character, while affording sufficient compressional strength and a secure hold on the handle.

The rearward end 32 of the spatula preferably is not convex, but rather flat or concave, as shown, and the surface defined by its rim is perpendicular to the longitudinal axis of the spatula. Thus after using the spatula it may be set on end and the blade, which bears a residue of the material just mixed, held aloft and out of contact with other surfaces.

The model of the spatula shown in FIGURE 11 includes a handle portion 42 formed with a peripheral ridge or rim 44 and a central web 46 which spans and merges with the ridge. This ridge and web construction of the handle substantially reduces the amount of material required to form the spatula, in keeping with its inexpensive, disposable character, while affording sufficient compressional strength and a comfortable and secure hold on the handle. Also, the flat surface of the web provides a convenient space for carrying advertising 48, or other indicia. As in the model shown in FIGURE 6, the rearward end 52 of the spatula is not convex but rather flat or concave, and the surface defined by its rim is perpendicular to the longitudinal axis of the spatula, so that after use the spatula may be set on end and the blade held aloft.

While specific embodiments of the invention have been described, various modifications of the spatula, or like instruments, will be apparent to those familiar with the principles of the invention. Accordingly, the scope of the invention should be construed, not by the described embodiments, but by the following claims.

I claim:

1. A molded plastic spatula including a small blade and a large handle, the blade having a distinct side edge surface, the side edge surface forming sharp corners with the top and bottom surfaces of the blade and between the corners bearing traces defining the mold parting line.

2. A spatula as set forth in claim 1 in which the blade is thickened in the center to form a longitudinally extending ridge rising substantially equal amounts above both the top and bottom surfaces of the blade.

3. A spatula as set forth in claim 2 in which the side edge surface of the blade diverges from the tip towards the handle and in which the side edge surface forms substantially square corners with the top and bottom surfaces.

4. A spatula formed entirely of a moldable material in the cavity of a mold which parts about the molded spatula to free it from containment, the spatula having a wide, flat blade portion and a discrete handle portion, the blade being thick enough throughout its cross-section to present substantial resistance to deflection during use, the blade including straight sides and a continuous side edge surface which forms distinctly different and sharp corners with the top and bottom surfaces of the blade, the blade including traces defining the mold parting line along the side edge surface only between the corners.

5. A spatula as set forth in claim 4 in which the side edge surface of the blade diverges from the tip towards the handle and in which the side edge surface forms substantially right angled corners with both the top and the bottom surfaces of the blade.

6. A spatula as set forth in claim 4 in which the handle is polygonal in section, and including a spherical knob at the rearward end of the handle, and a rounded shank portion between the blade portion and the handle portion.

7. A spatula as set forth in claim 4 in which the handle portion is substantially larger in cross-section than the blade portion and interfits with a portion of a similar spatula.

8. A spatula as set forth in claim 4 in which the rearward end of the handle is not convex, and the rim of the rearward end defines a plane substantially perpendicular to the longitudinal axis of the spatula.

9. A spatula as set forth in claim 8 in which the handle includes a series of discs spaced from one another sufficiently to permit the handle portion to interleave with the handle portion of a similar spatula.

10. A spatula as set forth in claim 8 in which the handle includes a peripheral ridge and a central web spanning and merging with the ridge.

References Cited

UNITED STATES PATETNS

| | | | |
|---|---|---|---|
| 745,544 | 12/1903 | Ward | 294—49 |
| 1,706,408 | 3/1929 | Miller | 15—245 |
| 2,141,223 | 12/1938 | Pistorius | 294—7 |
| 2,256,650 | 9/1941 | Reid et al. | 15—245 |
| 2,489,606 | 11/1949 | Allen | 15—236 |
| 2,860,858 | 11/1958 | Kurs | 259—144 |
| 2,900,656 | 8/1959 | Tupper | 15—245 |
| 2,950,534 | 8/1960 | Pletman | 32—40 |
| 2,964,773 | 12/1960 | Pence | 15—245 |
| 3,010,131 | 11/1961 | Kisky | 15—143 |

FOREIGN PATENTS 562,430  6/1944  Great Britain.

GERALD A. DOST, *Primary Examiner.*